Sept. 16, 1958 N. F. FLESCH 2,852,103
RESILIENT MOUNTING FOR BRAKE LEVER CONNECTION
Filed Sept. 2, 1955 2 Sheets-Sheet 1
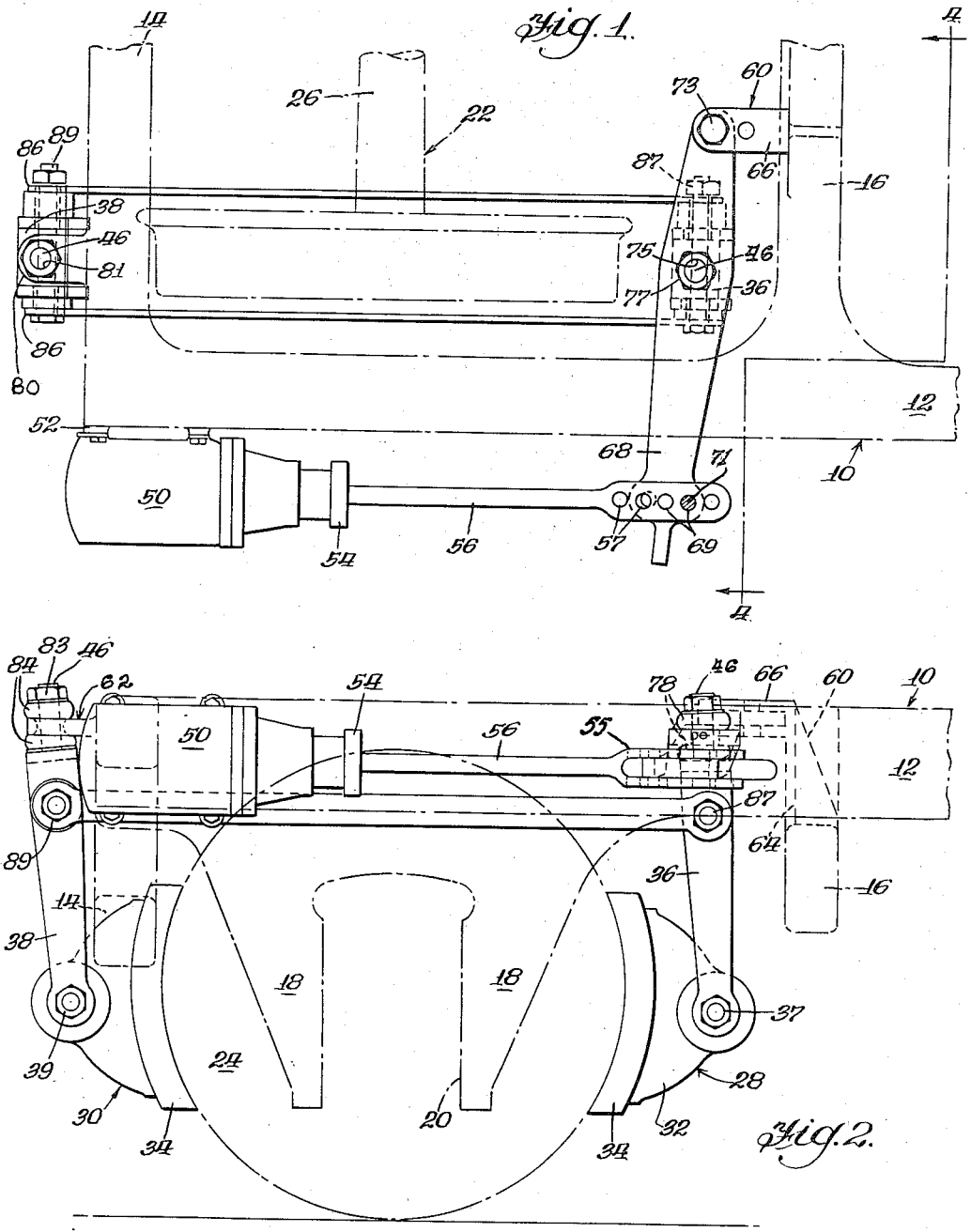
INVENTOR.
Norman F. Flesch
BY
Walter L. Schlegel Jr. Atty.
Witness:
Richard W. Carpenter Sept. 16, 1958      N. F. FLESCH      2,852,103
RESILIENT MOUNTING FOR BRAKE LEVER CONNECTION
Filed Sept. 2, 1955      2 Sheets-Sheet 2
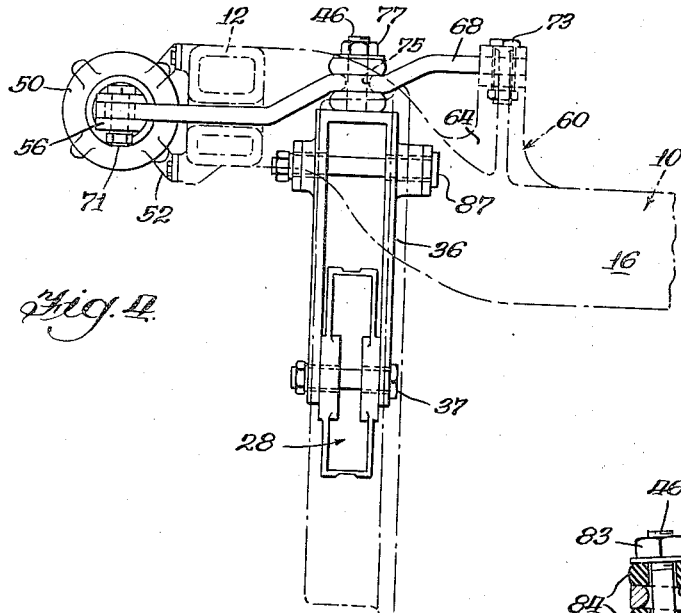
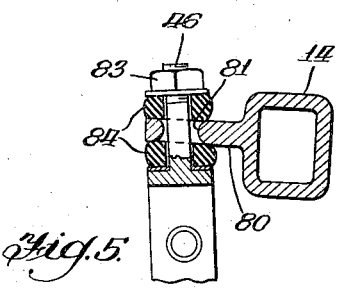
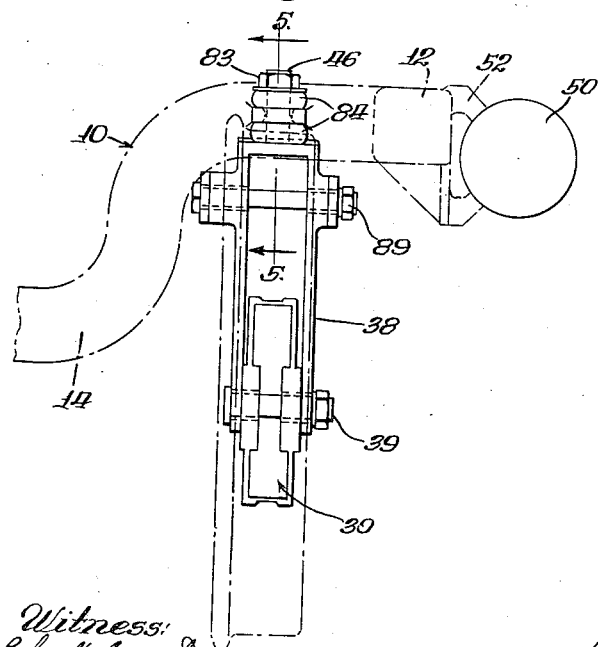
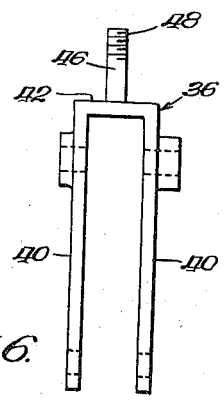
INVENTOR.
Norman F. Flesch
BY
Walter L. Schlegel, Jr. Atty.
Witness:

United States Patent Office 2,852,103
Patented Sept. 16, 1958

2,852,103

RESILIENT MOUNTING FOR BRAKE LEVER CONNECTION

Norman F. Flesch, Park Forest, Ill., assignor to American Steel Foundries, Chicago, Ill., a corporation of New Jersey Application September 2, 1955, Serial No. 532,196

12 Claims. (Cl. 188—56)

This invention relates to brake arrangements, and more particularly to brake arrangements adapted for use in railway car trucks.

The invention comprehends a simplified brake linkage having a minimum number of parts.

As is well known by those familiar with the railway art, brake linkage in railway car trucks is continually subjected to severe jolts, shocks and torsional stresses, which cause frequent fractures of the individual elements as well as separations of the elements from each other.

The conventional manner of connecting brake levers to the frame and to related actuating levers has been by pivot pin. This arrangement requires expensive machined bushings and extra links or clevises, and is not completely satisfactory because it does not allow the brake levers the freedom of lateral or nonpivotal movement needed to absorb torsional stresses and other shocks or jolts.

It is therefore a primary object of this invention to provide a simplified brake linkage wherein the brake levers are afforded resilient movable connections.

Another object of the invention is to provide swivel connections for the brake levers.

Another object is to provide the swivel connections with spring means which not only cushion jolts, but also aid in the release of the brake levers.

A more specific object is to provide an arrangement wherein each brake lever is formed with an upstanding spindle, having resilient pads thereon, which is swivelled to a related member of the truck.

Another object is the provision of brake levers having double brake shoe assembly supporting elements, thereby eliminating the necessity for auxiliary brake hangers.

Another object is the provision of a simplified brake linkage comprising a dead brake lever movably connected to the frame, an actuating lever having one end fulcrumed to the transom and the other end operatively connected to a power cylinder, and a live brake lever movably connected to the actuating lever and to the dead brake lever.

These and other objects of the invention will be apparent from an examination of the following description and drawings, wherein:

Figure 1 is a fragmentary plan view of a portion of a railway car truck embodying the invention;

Figure 2 is a side elevational view of the structure illustrated in Figure 1;

Figure 3 is an end elevational view of the structure illustrated in Figure 2;

Figure 4 is a fragmentary sectional view taken along the line 4—4 of Figure 1;

Figure 5 is a fragmentary sectional view taken along the line 5—5 of Figure 3;

Figure 6 is a detail end elevational view of a brake lever embodying the invention.

It will be understood that certain elements have been omitted from certain views where they are illustrated to better advantage in other views.

Referring now to the drawings for a better understand of the invention, it will be seen that the frame indicated generally at 10 comprises spaced side members 12 (only one of which is shown) which are interconnected by end rails 14 and transoms 16, which are disposed between the end rails. (Only one end rail and transom is illustrated in the drawings.) The side member 12 is preferably formed with depending spaced pedestal jaws 18 which define a journal opening 20 therebetween.

The frame may be supported by a plurality of wheel and axle assemblies 22 (only one of which is shown) each of which comprises a wheel 24 and an axle 26, journaled in a conventional manner (not shown) in opening 20 of the side member.

As best seen in Figure 2, inner and outer brake shoe assemblies 28 and 30 are positioned on either side of the wheel 24 for frictional engagement with its outer periphery. Each brake shoe assembly preferably comprises a brake head 32 and a brake shoe 34.

The brake shoe assemblies 28 and 30 may be supported by and pivoted to inner and outer generally vertical brake levers 36 and 38 by pins 37 and 39, respectively.

As best seen in Figure 6, each brake lever is generally fork shaped and comprises spaced depending brake shoe assembly supporting elements 40 interconnected at their upper ends by a horizontal yoke 42. Upstanding from yoke 42 is a preferably cylindrical swivel pin or spindle 46, the upper portion of which may be threaded as at 48. All of the elements of the brake lever may be formed integrally with each other if desired.

Referring again to Figure 1, it will be seen that a power cylinder 50 is secured to the side member 12 by mounting bracket 52. The cylinder 50 comprises a piston 54 having a piston rod 56 extending therefrom. The end 55 of the piston rod remote from the cylinder is preferably bifurcated, and is provided with a plurality of coaxially aligned spaced openings 57.

Transom 16 and the end rail 14 are provided with mounting brackets 60 and 62, respectively. The inner, or transom, bracket 60 preferably comprises a vertical portion 64 formed integrally with or rigidly secured to the transom and having vertically spaced lugs 66 extending outwardly therefrom.

Disposed between the inner bracket 60 and the piston rod 56 of the power cylinder is a generally horizontal actuating lever 68, having offset end portions, as best seen in Figure 4. The outboard end of the actuating lever is provided with a plurality of spaced openings 69 for selectively adjustable pivotal connection to piston rod 56 by pin 71. The inboard end of the actuating lever is pivoted to the lugs 66 of the bracket 60 by pin 73.

Actuating lever 68 is provided intermediate its ends with an opening 75 having rounded sides and through which is received spindle, or swivel pin, 46 of inner brake lever 36. A nut 77 threadably received on the spindle serves to lock the parts in engagement with each other. A pair of resilient pads 78, preferably rubber, are positioned on the spindle above and below the actuating lever and in abuttable engagement therewith. These pads afford resilient mounting for the brake lever, which by virtue of the swivel connection is afforded freedom of movement in any direction.

The outer, or end rail, mounting bracket 62 comprises a lug 80 extending outwardly from the end rail and having an aperture 81 therein capable of receiving the spindle, or swivel pin, 46 of the outer brake lever 38. The nut 83 serves to lock the parts together. The spindle of this brake lever is also provided with a pair of spaced resilient pads 84, positioned above and below lug 80 and in abuttable engagement therewith. Thus it will be seen that by the novel swivel connections for the brake levers the need for certain machined bushings for pivot pins, as well as auxiliary links or clevises, is avoided. The inner and outer brake levers 36 and 38 may be interconnected intermediate their respective ends by a preferably double pull rod 86, pivoted by pins 87 and 89, to the respective brake levers.

To describe the operation of the invention, it will be understood that as the power cylinder is actuated the piston rod moves to the right, as seen in Figure 1, urging the actuating lever 63 to rotate counterclockwise about pin 73. As inner brake lever 36 pivots clockwise about pin 87, as seen in Figure 2, it carries inner brake shoe assembly 28 into engagement with the adjacent wheel 24. As the inner brake shoe assembly engages the wheel, the motion of the piston rod and actuating lever continues and the pivot point of the inner brake lever 36 shifts from pin 87 to pin 37. As brake lever 36 continues to pivot clockwise moving pull rod 86 to the right, as seen in Figure 2, outer brake lever 38 is urged to move to the right and carry outer brake shoe assembly 30 into engagement with the wheel.

It will be noted that because of the novel design of the break levers, as best seen in Figure 6, a double support is afforded by each brake lever for the related brake shoe assembly, thereby eliminating the necessity for auxiliary brake hangers.

Also it will be understood that the novel resilient mountings for the brake levers serve a dual purpose, the rubber pads not only cushion the brake linkage but also serve as release spring means for the brake shoe assemblies as pressure from the power source is decreased.

Although the novel brake levers and resilient swivel mountings therefor are illustrated in a clasp brake system, the invention is not limited to any particular type of brake linkage, and will operate equally effectively in other brake arrangements.

I claim:

1. In a brake arrangement for a vehicle comprising a frame and a supporting wheel and axle assembly having a rotatable friction surface thereon, the combination of: friction means engageable with said surface, brake lever means connected to said friction means, and power means operatively connected to said brake lever means, said operative connection comprising resilient swivel means for said brake lever means, wherein said resilient swivel means comprises spaced rubber pads positioned on said brake lever means, said rubber pads being abuttably engaged with said brake lever means and operative connection.

2. In a brake arrangement for a vehicle having a frame and a supporting wheel and axle with a rotatable friction surface thereon, the combination of: brake shoe assemblies engageable with said surface, brake levers connected to respective shoe assemblies and to each other, power means, an actuating lever operatively connected to the power means, one of said brake levers being a dead lever swivelled to the frame, the other of said brake levers being a live lever swivelled to the actuating lever, said swivel connections comprising upstanding threaded swivel pins integral with said live and dead brake levers, resilient means disposed on said brake levers, said resilient means being engageable above and below said frame and actuating lever.

3. In a brake arrangement for a railway car truck having a frame and a supporting wheel and axle assembly with a rotatable friction surface thereon, the combination of: friction means engageable with said surface, brake lever means supported by the frame and connected to the friction means, said brake lever means comprising at least one brake lever having a spindle thereon, power means operatively connected to said spindle, said operative connection including resilient pads on said spindle, said pads being disposed on opposite sides of said operative connection.

4. In a brake arrangement for a vehicle having a frame member and a supporting wheel and axle assembly with a rotatable friction surface thereon, the combination of: friction means engageable with said surface, brake levers connected to respective friction means, means interconnecting said brake levers, power means, an actuating lever member operatively connected to said power means, one of said brake levers being a dead lever and having a spindle swivelled to the frame member, another one of said brake levers having a spindle swivelled to the actuating lever member, and resilient means on each of said spindles adjacent the related member.

5. In a brake arrangement for a vehicle having a frame member and a supporting wheel and axle assembly with a rotatable friction surface thereon, the combination of: friction means engageable with said surface, brake levers connected to respective friction means, means interconnecting said brake levers, power means, an actuating lever member operatively connected to said power means, one of said brake levers being a dead lever and having an upstanding spindle movably connected to the frame member, another one of said brake levers having an upstanding spindle movably connected to the actuating lever member, and resilient pads positioned on each of said spindles on either side of the related member.

6. In a brake arrangement for a railway car truck comprising a frame member with spaced side frames interconnected by end rails and transoms, and a supporting wheel and axle assembly, the combination of: power means, an actuating lever having an outboard end operatively connected to said power means and having an inboard end fulcrumed to one of the transoms, friction means engageable with said assembly to decelerate the truck, brake levers connected to said friction means respectively, and operatively connected to each other, one of said brake levers being a dead lever, an upper end of said dead lever comprising a swivel pin, said swivel pin being swiveled to the frame, the other of said brake levers being a live lever, an upper end of said live lever being a swivel pin, said last mentioned swivel pin being swiveled to said actuating lever, and spaced resilient means being positioned on said pins, said resilient means being engageable above and below said actuating lever and frame to allow freedom of movement of said brake levers.

7. In a brake arrangement for a vehicle comprising a frame and a supporting wheel and axle assembly, the combination of: actuating means, friction means engageable with said assembly to decelerate the truck, brake levers connected to said friction means, respectively, and operatively connected to each other, one of said brake levers being a dead lever having one end movably connected to the frame, the other of said brake levers being a live lever having one end movably connected to the actuating means, wherein said movable connections comprise upstanding spindle means on the brake levers which are swivelled to the frame and actuating means, respectively, a resilient means on said spindle means, said resilient means comprising spaced pads disposed above and below said frame and actuating lever and abuttably engageable with said frame and actuating lever.

8. In a brake arrangement for a railway car truck comprising a frame and a supporting wheel and axle assembly, the combination of: friction means positioned adjacent and engageable with said assembly to decelerate the truck, brake levers pivoted at their lower ends to respective friction means, a rod pivoted to said levers intermediate their respective ends, one of said levers being a dead lever having at its upper end upstanding pin means integral therewith, said pin means being pivotally connected to said frame, a power cylinder secured to the frame outboardly thereof, a dead actuating lever operatively connected at its outboard end to the cylinder, said actuating lever being fulcrumed at its inboard end to the frame, the other of said brake levers being a live lever having at its upper end upstanding pin means integral therewith, the live lever pin means being pivotally connected to a medial portion of the actuating lever, resilient means disposed on each pin means, the dead lever resilient means comprising spaced pads disposed above and below the frame and in abutment therewith, the live lever resilient means comprising spaced pads disposed above and below the actuating lever and in abutment therewith.

9. In a railway car truck comprising a frame and frame member and a supporting wheel and axle assembly, the combination of: friction means positioned adjacent and engageable with said assembly to decelerate the truck, brake levers pivoted at their lower ends to respective friction means, means interconnecting the levers intermediate their respective ends, one of said levers being a dead lever comprising upstanding pin means integral with the upper end thereof, said pin means being pivotally connected to the frame member, a dead actuating lever extending transversely of the frame and having its inner end fulcrumed to the frame, power means operatively connected to the outer end of said actuating lever, the other of said levers being a live lever comprising upstanding pin means integral with the upper end thereof, said live lever pin means being pivotally connected to a medial portion of the actuating lever, resilient means disposed on said dead lever pin means and positioned above and below said frame member, and resilient means on said live lever pin means and positioned above and below said actuating lever, said resilient means on said live and dead lever pin means being in abutment with the actuating lever and frame member, respectively.

10. In a brake arrangement for a vehicle having a frame and a supporting wheel and axle with a rotatable friction surface thereon, the combination of: brake shoe assemblies engageable with said surface, brake levers connected to respective assemblies, means interconnecting the brake levers, power means, an actuating lever, means operatively connecting the actuating lever to the power means, one of said brake levers being a dead lever having a swivel pin formed integrally on its upper end, means pivotally connecting the pin to the frame, said means comprising spaced resilient means positioned on said pin and disposed above and below the frame in abutment therewith, and the other of said brake levers being a live lever having a swivel pin formed integrally on its upper end, means pivotally connecting the live lever pin to the actuating lever, said last-mentioned means comprising spaced resilient means positioned on the live lever pin and disposed above and below the actuating lever in abutment therewith.

11. In a brake arrangement for a railway car truck comprising a frame having spaced side frames interconnected by end rail members and transoms and a supporting wheel and axle assembly having a rotatable friction surface thereon, friction means engageable with said surface, brake levers connected at their lower ends to said friction means, means interconnecting the medial portions of the levers, power means, a dead actuating lever member having one end operatively connected to the power means and another end fulcrumed to one of said transoms, one of the brake levers being a dead lever having an upstanding spindle integral with the upper end thereof and movably connected to one of the end rail members, the other of said brake levers being a live lever having an upstanding spindle integral with the upper end thereof and movably connected to the actuating lever member, and resilient pads on each of said spindles disposed on opposite sides of the related member in abutment therewith.

12. In a brake arrangement for a railway car truck comprising a frame and a supporting wheel and axle assembly; the combination: of friction means engageable with a friction surface of said assembly, a brake lever pivotally connected to said friction means on an axis substantially parallel to the rotational axis of said assembly, a lug on said frame, a spindle on said lever extending through a hole in the lug, the longitudinal axis of the spindle being substantially normal to said first-mentioned axis, resilient pads carried by the spindle, means on the spindle compressing the pads against opposite sides of the lug, one of said pads being compressed against a surface of the lever facing the lug to hold the lever in release position whereat said friction means is spaced from said surface, said spindle being smaller in diameter than said hole to accommodate fulcruming of the lever during actuation and release thereof, said spindle and pads constituting the sole means for fulcruming the lever to said lug, and actuating means operatively connected to the lever for urging it toward said surface to engage the friction means therewith.

References Cited in the file of this patent

UNITED STATES PATENTS

| | | |
|---|---|---|
| 814,489 | Webster | Mar. 6, 1906 |
| 817,994 | Scofield | Apr. 17, 1906 |
| 893,274 | Starrett | July 14, 1908 |
| 1,998,976 | Baselt | Apr. 23, 1935 |
| 2,009,725 | Blunt | July 30, 1935 |
| 2,163,534 | Baselt | June 30, 1939 |
| 2,276,337 | Pflager | Mar. 17, 1942 |
| 2,431,579 | Mueller | Nov. 25, 1947 |
| 2,460,248 | Baselt | Jan. 25, 1949 |
| 2,613,766 | Miers | Oct. 14, 1952 |